US009412099B1

(12) United States Patent
Tyree (10) Patent No.: US 9,412,099 B1
(45) Date of Patent: Aug. 9, 2016

(54) AUTOMATED ITEM RECOGNITION FOR RETAIL CHECKOUT SYSTEMS

(71) Applicant: CA, Inc., Islandia, NY (US)

(72) Inventor: David S. Tyree, Wheat Ridge, CO (US)

(73) Assignee: CA, Inc., New York, NY (US)

( * ) Notice: Subject to any disclaimer, the term of this patent is extended or adjusted under 35 U.S.C. 154(b) by 617 days.

(21) Appl. No.: 13/890,595

(22) Filed: May 9, 2013

(51) Int. Cl.
*G06Q 30/00* (2012.01)
*G06Q 20/12* (2012.01)

(52) U.S. Cl.
CPC ..................... *G06Q 20/12* (2013.01)

(58) Field of Classification Search
CPC .......................... G06Q 30/06–30/08
USPC ............................. 705/26.1–27.2
See application file for complete search history.

(56) References Cited

U.S. PATENT DOCUMENTS

| | | | | |
|---|---|---|---|---|
| 4,843,561 A | * | 6/1989 | Larson ................... | A01D 46/24 209/587 |
| 5,831,873 A | * | 11/1998 | Kohnen ................... | G01V 3/08 701/408 |
| 6,505,775 B1 | * | 1/2003 | Gu ........................... | G01J 3/26 235/454 |
| 7,909,248 B1 | * | 3/2011 | Goncalves ............ | G07G 1/0063 235/375 |
| 2001/0051901 A1 | * | 12/2001 | Hager ................... | G06Q 20/202 705/26.8 |
| 2003/0009448 A1 | * | 1/2003 | Covington, Jr. ... | G06F 17/30867 |
| 2010/0140351 A1 | * | 6/2010 | Trenciansky ...... | G08B 13/2485 235/383 |
| 2012/0148020 A1 | * | 6/2012 | Arroyo, Jr. ........... | G01V 5/0033 378/57 |

* cited by examiner

*Primary Examiner* — Ethan D Civan
(74) *Attorney, Agent, or Firm* — Myers Bigel & Sibley, P.A.

(57) ABSTRACT

A retail checkout system includes a camera, a database, a processor, and a memory. The camera outputs an image of a purchase item. The database contains features of known items. The processor performs operations to extract features of the purchase item from the image of the purchase item, and identifies matches between the features of the purchase item and the features of known items. The processor identifies a group of candidate items among the known items responsive to insufficient matches between the features of the purchase item and the features of any one of the known items. The processor displays information identifying the candidate items, receives a command selecting one of the candidate items as matching the purchase item, and adjusts information in the database that defines the features of the selected one of the candidate items based on the features of the purchase item.

22 Claims, 5 Drawing Sheets

AUTOMATED ITEM RECOGNITION FOR RETAIL CHECKOUT SYSTEMS

BACKGROUND

The present disclosure relates to retail checkout systems.

In many traditional retail establishments, a cashier receives items to be purchased and scans them with a Universal Product Code (UPC) scanner. The cashier is responsible for ensuring that all the items are properly scanned before they are bagged. As some retail establishments incorporate customer self-checkout options, the customer assumes the responsibility of scanning and bagging items. However, UPC checkout system can have operational problems due to difficulties with scanning UPC labels that are not properly positioned relative to a scanner device and/or UPC labels that have become damaged. Moreover, some items may not have UPC labels for various reasons. There is therefore a need to improve how items are identified during the retail checkout process.

BRIEF SUMMARY

One aspect of the present disclosure is directed to a retail checkout system that includes a camera, a database, a processor, and a memory. The camera outputs an image of a purchase item. The database contains features of known items. The memory is coupled to the processor and includes computer readable program code that when executed by the processor causes the processor to perform operations to extract features of the purchase item from the image of the purchase item. The processor also identifies matches between the features of the purchase item and the features of known items, and identifies a group of candidate items among the known items responsive to insufficient matches between the features of the purchase item and the features of any one of the known items. The processor displays information identifying the candidate items, receives a command selecting one of the candidate items as matching the purchase item, and adjusts information in the database that defines the features of the selected one of the candidate items based on the features of the purchase item.

Some further aspects are directed to the matching being performed using strength of magnetic fields from the purchase item that are measured by a magnetometer, using features of an object inside packaging of the purchase item that are identified by a millimeter wave scanner, using chemical composition features of a surface of the purchase item that are measured by a spectrometer, using surface hardness of the purchase item that is measured by an ultrasonic sensor, using features of an object inside packaging of the purchase item that are measured by an ultrasonic sensor, and/or an using infrared image of the purchase item that is output by the camera.

Related methods are disclosed. It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

As explained above, retail checkout systems have traditionally used UPC scanners to identify items (e.g., products and/or services that a customer is purchasing from a retailer). Such UPC checkout system can have operational problems when attempting to scan UPC labels that are not properly positioned relative to a scanner device or scan UPC labels that have become damaged or are missing (e.g., absence of UPC labels on fruits, vegetables, and small items). An operator usually needs to manually enter a code into the system for an item when a corresponding UPC label cannot be properly scanned. One system has been proposed that uses computer vision to assist with identification of a purchase item that is being scanned for a UPC label.

Some embodiments of the present disclosure improve upon processes for computer vision assisted identification of items. These embodiments include a learning process that uses computer vision to identify groups of candidate items, and uses a selected one of the candidate items as a feedback response to adapt how features of the selected item are defined in a database of known items.

Some other embodiments of the present disclosure sense non-visual features of an item which are then compared to features of known items in a database to identify the item. As will be explained in further detail below, non-visual features of an item can be sensed using a magnetometer, a millimeter wave scanner, a spectrometer, an ultrasonic sensor, and/or an infrared camera. The non-visual features are then used for comparison to features of known items in the database to identify the item.

Figure 1:
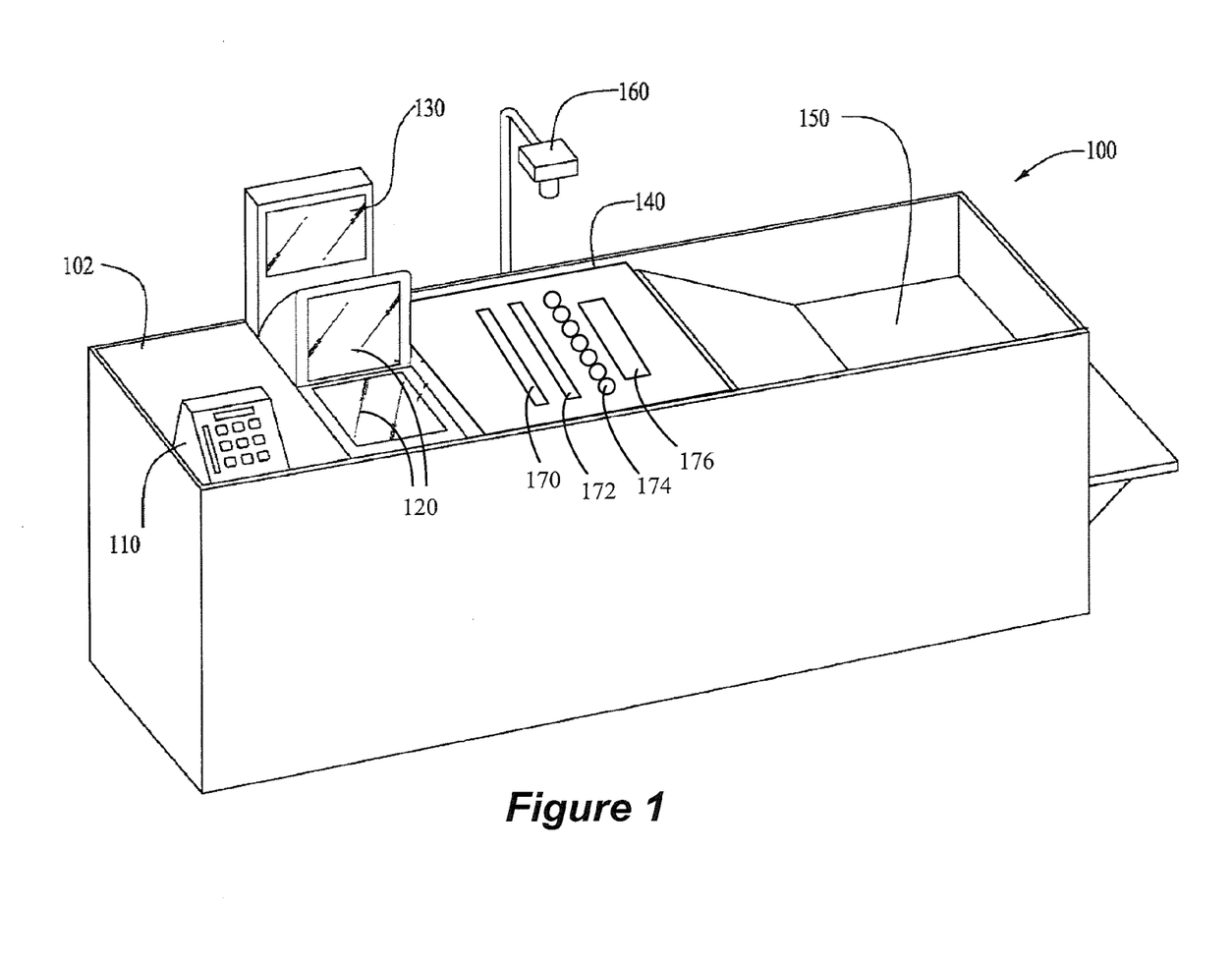
FIG. 1 is a perspective view of a retail checkout system according to an embodiment.

FIG. 1 is a perspective view of a retail checkout system 100 according to an embodiment disclosed herein. The retail checkout system 100 may be operated by a customer (e.g., self checkout system) or store cashier (clerk) at, for example, a grocery store or other retail facility. The system 100 can operate to automatically identify items that are moved within range an array of sensors, with the cost of the identified items being added to a checkout list for payment by a customer. The retail checkout system 100 includes a counter top 102, a UPC scanner 120 (or other optical code reader), and a bagging area 150 where identified items can be placed in shopping bags.

The retail checkout system 100 further includes one or more sensors 160-176 that are configured to identify items that may not been identifiable by the UPC scanner 120 due to, for example, absence of a UPC label on the item, damaged UPC label, or improperly positioned UPC label relative to the UPC scanner 120. The UPC scanner 120 may take the form of a bed scanner that scans a UPC label from under glass, scanner gun that is aimed at the UPC label, or visual sensor for capturing an image of a UPC label from which the UPC can be decoded, for example. The UPC is used to lookup information that identifies the item and its cost from a UPC database 218, so that the identity and cost can be added to a purchase list for the customer. The UPC scanner 120 area may include a scale that provides weight information for an item to allow determination of a weight based price for the item. The weight information may be further used to assist with identifying an item by comparison to weight related features in the database 220. The retail checkout system 100 can include a touch screen display device 130 and payment interface 110 for receiving cash, credit, and/or debit payments for the purchase list.

Although some embodiments are described in the context of the sensors 160-176 being used in a secondary identification role to identify items that have not been identified by the UPC scanner 120, embodiments are not limited to use with a UPC scanner 120. Instead, embodiments of retail checkout systems may use one or more of the sensors 160-176 to identify an item without use of a UPC scanner.

Figure 2:
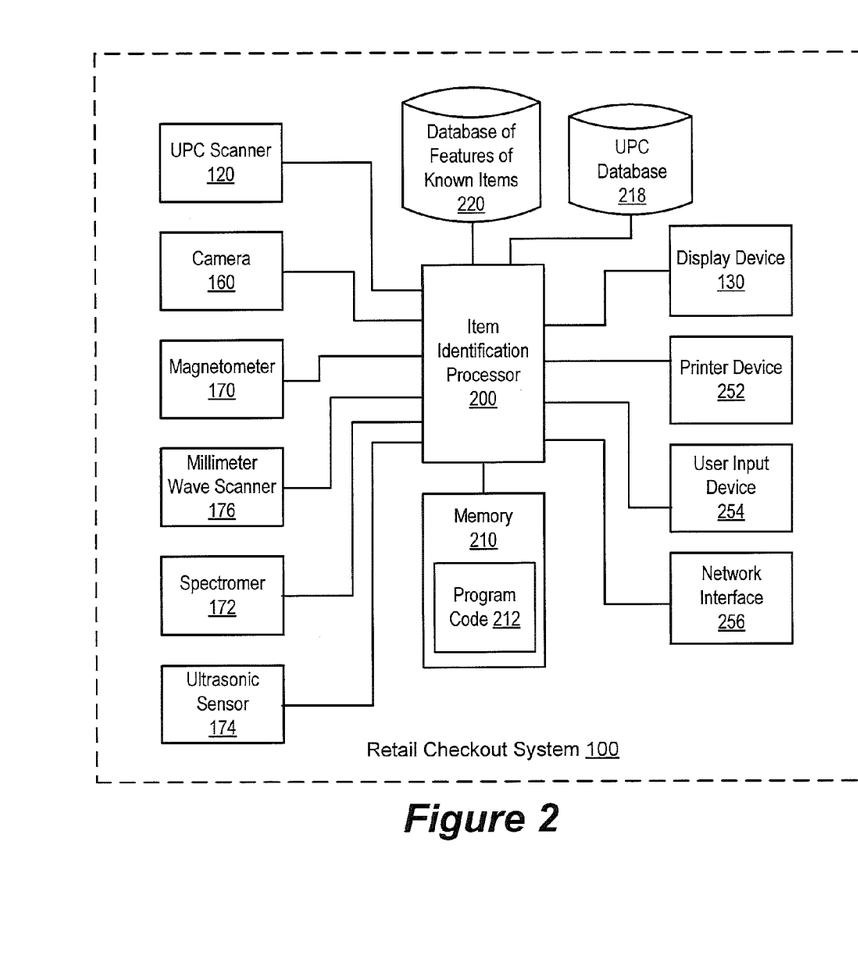
FIG. 2 is a component block diagram of a retail checkout system according to another embodiment.

FIG. 2 is a component block diagram of the retail checkout system 100 according to an embodiment. An operator can be instructed (e.g., via the display 130) to move an item that was not identified by the UPC scanner 120 to a counter top 140 within range of one or more of the sensors 160-176. The counter top 140 may include a conveyor belt that is positioned along a pathway to the bagging area 150. An item identification processor 200 is coupled to a database 220 that contains information identifying features of known items.

The processor 200 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 200 is configured to execute computer readable program code 212 of functional applications residing in a memory 210, described below as a computer readable storage medium, that causes the processor 200 to perform at least some of the operations and methods described herein as being performed by the retail checkout system 100 in accordance with one or more embodiments disclosed herein.

The processor 200 extracts features of an item from one or more of the sensors 160-176. The processor 200 then compares the extracted features to features of the known items in the database 220 to attempt to identify a match. When a match is identified, the processor 200 further retrieves information from the database 220 that identifies the item and its cost, which s added to a purchase list for the customer. The database 220 may contain information that directly identifies the item and its cost, or may contain a UPC code for the item which is then used to lookup information identifying the item and its cost from the UPC database 218 or elsewhere.

In one embodiment, the system 100 includes any one or more of the sensors 160-176, which may include a camera 160, a magnetometer 170, a spectrometer 172, an ultrasonic sensor 174, and a millimeter wave scanner 176. Although a single the sensors 160-176 are illustrated in FIG. 1 as being positioned at a single location, there may instead be a plurality of one or more of the different types of sensors 160-176 which are spaced apart at different locations that allow sensing an item from different relative directions (e.g., sense different item surface portions). The system 100 may further include a printer device 252 (e.g., purchase receipt printer), a user input device 254 (e.g., touch sensitive portion of the display 130), and a network interface 256. The database 220 of features of known items, the UPC database 218, and/or other components that are illustrated in FIG. 2 as being part of the system 100 may instead be separate but communicatively connected to the system 100 through the network interface 256.

Figure 3:
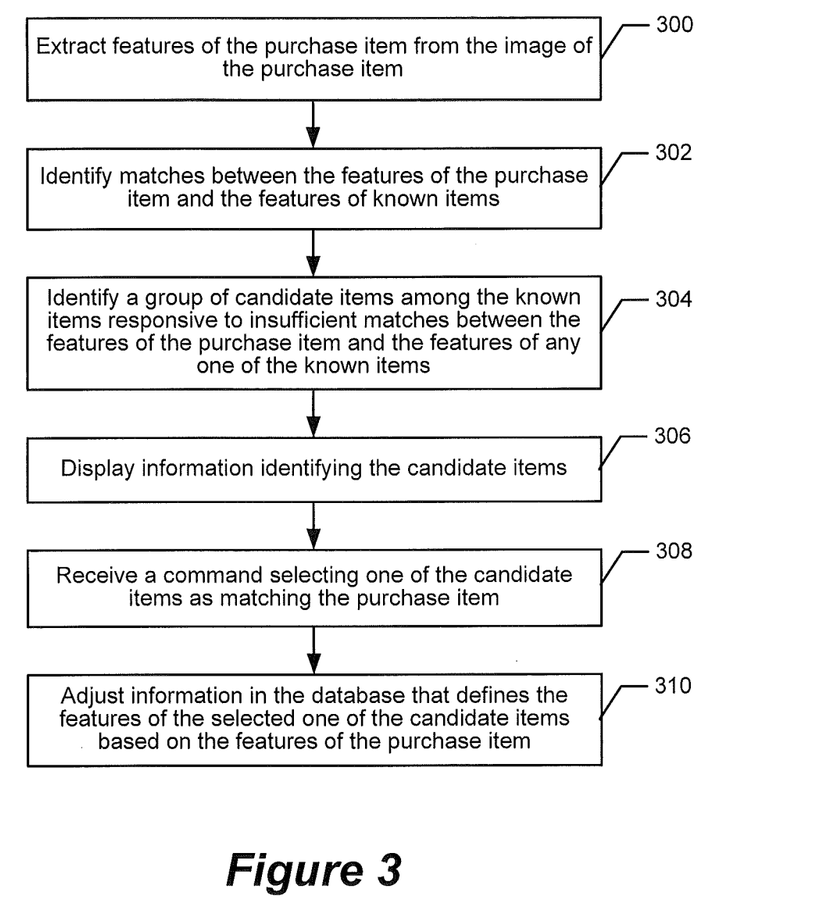
FIGS. 3-6 are flowcharts of operations performed by a processor of a retail checkout system executing computer readable program code according to some embodiments.

The camera 160 may be an infrared wavelength camera that outputs an infrared image of an item within its field of view and/or may be a human visual wavelength camera that outputs an image of the item. FIG. 3 is a flowchart of operations performed by the item identification processor 200 to perform a learning process that identifies groups of candidate items responsive to an image from the camera 160, and that uses a selected one of the candidate items as feedback to adapt how features of the selected item are defined in the database 220 of features of known items.

Referring to FIGS. 2 and 3, features of an item to be purchased (purchase item) are extracted (block 300) from the image of the item. Extraction of features from the image of the item may include using a Haar Cascade Filter technique. The extracted features may include an indication of size of the item determined based on a known location of the camera 160 (or cameras). Matches between the features of the purchase item and the features of known items (obtained from the database 220) are identified (block 302). A single known item can be identified in response to a sufficient level of matching being identified between features of the purchase item and features of known items (e.g., a predetermined number of features are matched). In contrast, a group of candidate items are identified (block 304) among the known items identified by the database 220 responsive to insufficient matches being identified between the features of the purchase item and the features of any one of the known items (e.g., when the features of the purchase item have more than a threshold level of difference from any one of the known items). Responsive to identifying a group of candidate items, information is displayed (block 306) on the display 130 that identifies the candidate items. A command is received (block 308) selecting one of the candidate items as matching the purchase item. The command may be received responsive to an operator who has selected among the items displayed on the display 130 using a user input device 254, such as a touch sensitive portion of the display 130 or using another device (e.g., payment interface 110). Information in the database 220 that defines the features of the selected one of the candidate items is adjusted (block 310) based on the features of the purchase item. The learning process may include Bayesian classification processes or evolutionary learning processes.

For example, when the extracted features of the purchase item do not sufficiently match any of the known items, an operator is presented with a list of the closest matching known items. The operator selecting one of the closest matching known items causes the features in the database 220 for the selected one of the closest matching known items to be adjusted to more closely correspond to the extracted features of the purchase item. In this manner, the features of individual ones of the known items in the database 220 can be adjusted over time to more closely match the extracted features of purchase items when an operator(s) has confirmed individual correspondences between those purchase items and known items. These learning operations can improve the accuracy of the matching that is obtainable using the database 220.

Figure 4:
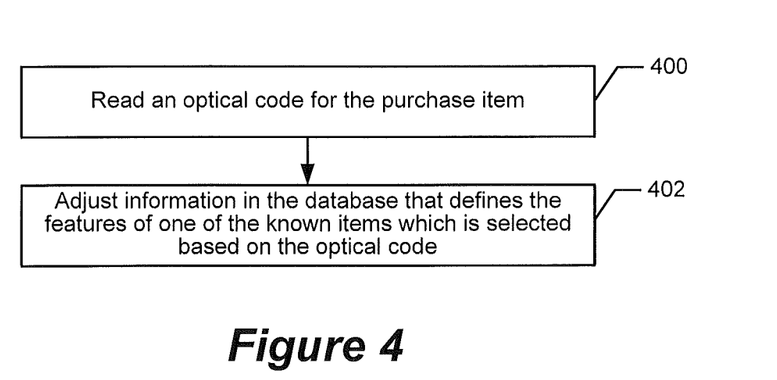

Various learning operation may be combined with recognition of a purchase item using the UPC scanner 120. Referring to the operation of FIG. 4, the UPC scanner 120 (or other optical code reader) is operated to read (block 400) a UPC label (or other optical code) for the purchase item. Information in the database 220 that defines the features of one of the known items which is selected based on the optical code, is adjusted (block 402). Accordingly, features in the database 220 may be adjusted based on features extracted for purchase items that have been identified using a optical code that has been read for the purchase item. For example, when a UPC code is missing from the purchase item, an operator can scan the UPC code from another source (e.g., a store inventory listing of items and corresponding UPC codes) and trigger adjustment of the features in the database 220 to more closely match the extracted features of the purchase item.

Figure 5:
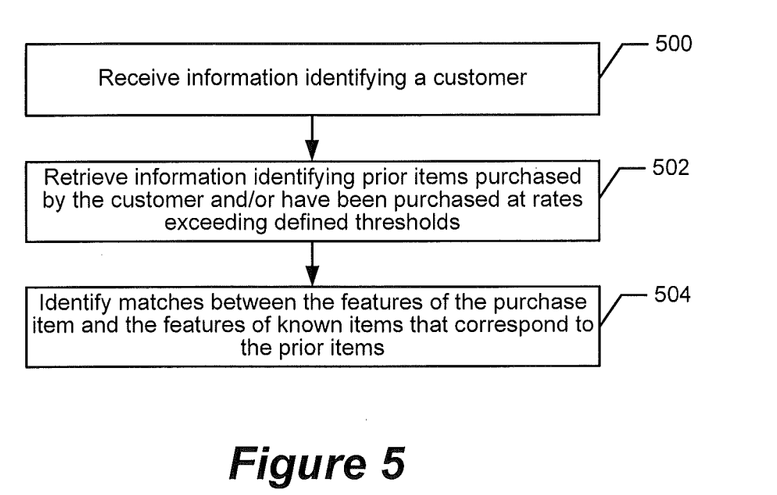

Some other embodiments are directed to identifying a purchase item based on the previous purchase history of a particular customer. Referring to FIG. 5, the processor 200 receives (block 500) information identifying a customer. The information may be received in response to, for example, scanning of a customer card that has been provided to the customer by a retailer. Information is retrieved (block 502) that identifies prior items that have been purchased by the customer. Matches are then identified (block 504) between the features of the purchase item and the features of known items that correspond to the prior items. Identification of one of the known items in the database 220 can thereby be assisted by knowing which items the customer as previously purchased. The threshold level of matching which is needed, between features of one of the known items in the database 220 and features of the purchase item, before the one of the known items is added to a list of items being purchased, can be lowered for prior items that are known to have been purchased by the customer.

Some other embodiments are directed to identifying a purchase item based on how often items have been purchased. The processor 200 can retrieve information (e.g. from the database 220) that identifies prior items that have been purchased at rates exceeding defined thresholds. Matches can be further identified between the features of the purchase item and the features of known items that correspond to the prior items. Identification of one of the known items in the database 220 can thereby be assisted by knowing which items are more popular during a timeframe (i.e., purchased at rates exceeding defined thresholds). The timeframe over which the rates are determined may be, for example, a single day, a week, a month, or another defined time period. The threshold level of matching which is needed, between features of one of the known items in the database 220 and features of the purchase item, before the one of the known items is added to a list of items being purchased, can be lowered for prior items that have been purchased at rates exceeding defined thresholds.

Some other embodiments are directed to identifying an item for purchase using the various different types of sensors 160-176. Referring to the system diagrams of FIGS. 1 and 2 the operational flowchart of FIG. 6, the processor 200 can recognize characters from the image output by the camera 160 of the purchase item. The processor 200 can further identify matches between the characters from the image of the purchase item and the features of known items. The characters can thereby be used as features which are compared to features of the known items in the database 220 for purposes of attempting to match the purchase item to one of the known items.

Figure 6:
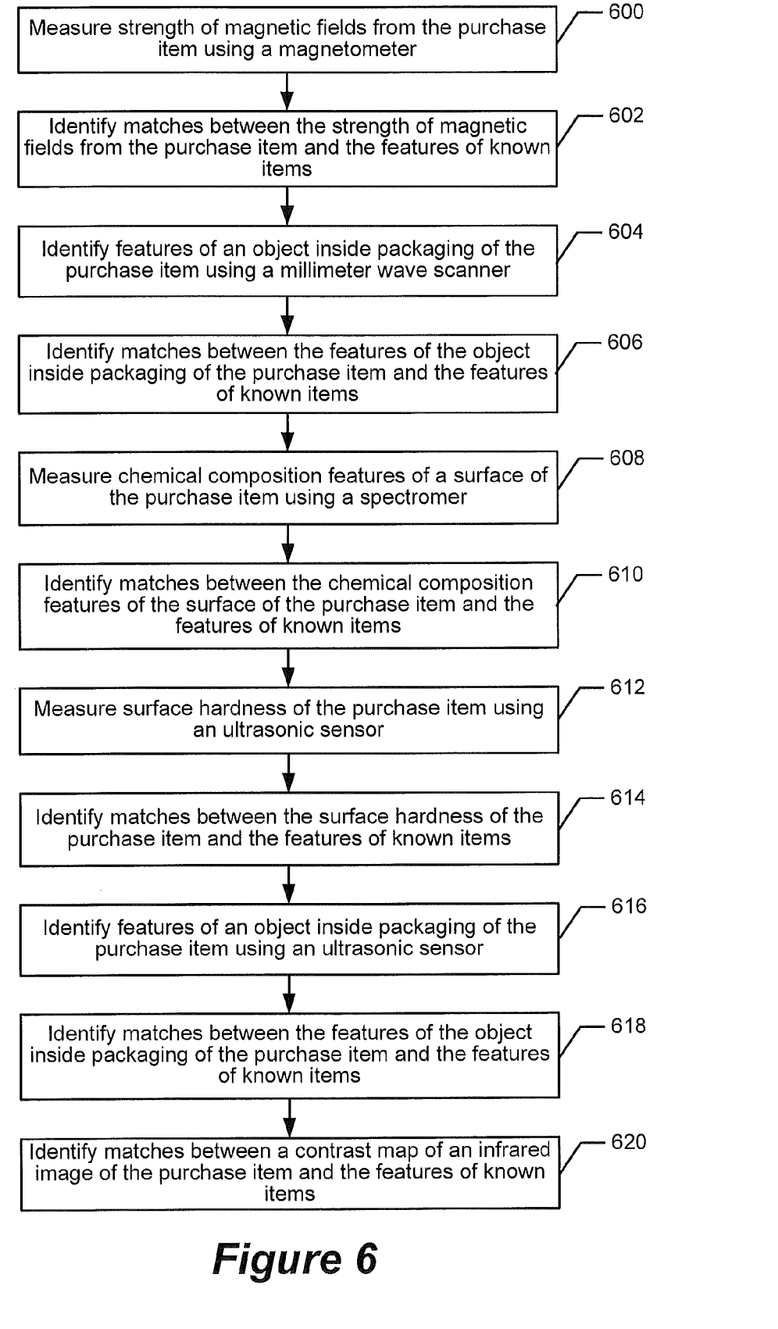

The magnetometer 170 measures (block 600) strength of magnetic fields from the purchase item. The processor 200 can further identify (block 602) matches between the strength of magnetic fields from the purchase item and the features of known items. The strength of magnetic fields of the purchase item, which is measured by the magnetometer 170, can thereby be used as a feature which is compared to features of the known items in the database 220 for purposes of attempting to match the purchase item to one of the known items.

The millimeter wave scanner 176 scans millimeter wavelength reflections of signals from a purchase item, and outputs corresponding information to the processor 200. The millimeter wave scanner 176 can be operated to identify (block 604) features of an object inside packaging of the purchase item. The processor 200 can perform operations to identify (block 606) matches between the features of the object inside packaging (e.g., within a shipping box, display box, or other enclosure) of the purchase item and the features of known items. The millimeter wave scanner 176 can thereby be used to identify features of one or more objects within packaging of purchase item, and those features can be compared to features of the known items in the database 220 for purposes of attempting to match the purchase item to one of the known items. The identified features may correspond to shape, contours, size, or other characteristics of the object(s) inside packaging of the purchase item.

The spectrometer 172 measures (block 608) chemical composition features of a surface of the item. More particularly, the spectrometer 172 can measure properties (e.g. intensity) of light reflected from a small defined area (e.g., several square centimeter or millimeter area) of the purchase item's surface when illuminated by light within one or more defined frequency ranges. The measured properties are compared to known information of the absorptive/reflective properties associated with different chemical compositions, to determine the chemical composition of the surface. The frequency ranges may be within the visible spectrum, however other frequency ranges such as far infrared, millimeter, and x-rays may be used.

The processor 200 can perform operations to identify (block 610) matches between the chemical composition features of the surface of the purchase item and the features of known items. The chemical composition of the surface of the purchase item can thereby be used for purposes of attempting to match the purchase item to one of the known items.

In one embodiment, the ultrasonic sensor 174 operates to measure (block 612) surface hardness of the purchase item. The processor 200 can perform operations to identify (block 614) matches between the surface hardness of the purchase item and the features of known items. Surface hardness of the purchase item can thereby be compared to features of the known items in the database 220 for purposes of attempting to match the purchase item to one of the known items.

In another embodiment, the ultrasonic sensor 174 operates to identify (block 616) features of an object inside packaging of the purchase item. The processor 200 can perform operations to identify (block 618) matches between the features of the object inside packaging of the purchase item and the features of known items. The ultrasonic sensor 174 can thereby be used to identify features of one or more objects within packaging of purchase item, and those features can be compared to features of the known items in the database 220 for purposes of attempting to match the purchase item to one of the known items. The identified features may correspond to shape, contours, size, or other characteristics of the object(s) inside packaging of the purchase item.

As explained above, the camera 160 can be an infrared wavelength sensing camera that outputs an infrared image of the purchase item. The processor 200 can perform operations to identify (block 620) matches between a contrast map of the infrared image of the purchase item and the features of known items. Features of the contrast map of the infrared image may be determined using a Haar Cascade Filter technique. The contrast map can thereby be used as a unique indicator of a particular one of the known items. The contrast map may correspond to a defined sub-area or an entire surface of the purchase item that is used by the camera 160. The contrast map may include a color histogram of the purchase item that is compared to features in the database 220 for matching purposes.

One or more of the embodiments disclosed herein may be combined with other sensor technologies for determining likely candidate items that a user is presenting to the system 100 for purchase. For example, the system 100 may include near field communication (NFC) and/or radio frequency identification (RFID) transceivers that can communicate with corresponding transceivers attached to purchase items.

For example, a shopping cart may include an electronic device configured to communicate with the retail checkout system 100 and other devices located in a retail facility to assist the system 100 with the process of identifying purchase items and associated characteristics. The shopping cart may include NFC and/or RFD transceivers that can communicate with corresponding transceivers attached to purchase items, and can communicate a list of items believed to be within the shopping cart to the system 100 for further identification and purchase accounting.

The shopping cart may include an electronic device configured to communicate with a weight sensor (scale) that is integrated into, for example, a product storage shelf/bin (e.g., produce bin). The weight sensor can respond to a change in weight by communicating information to the electronic device of the shopping cart that identifies the product and associated weight (or number products) that have been removed from the storage shelf and presumably placed into the shopping cart. The shopping cart can subsequently communicate such information (e.g., a list of items believed to be within the shopping cart) to the retail checkout system 100 for further identification and purchase accounting.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A retail checkout system comprising:
    a visual sensor;
    a non-visual sensor comprising one of a magnetometer, a millimeter wave scanner, a spectrometer, an ultrasonic sensor, and an infrared wavelength sensing camera;
    a scale;
    a database of features of known items;
    a processor; and
    a memory coupled to the processor and comprising computer readable program code, that when executed by the processor causes the processor to perform operations to:
        extract at least one visual feature of a purchase item from an output of the visual sensor;
        extract at least one non-visual feature of the purchase item from an electronic signal output of the non-visual sensor;
        receive a signal indicative of a weight of the purchase item from the scale;
        identify a group of candidate items among the known items based on a comparison between the at least one visual feature, at least one non-visual feature, and the weight of the purchase item and the features of the known items;
        cause display of information identifying the candidate items;
        receive a command selecting one of the candidate items as matching the purchase item; and
        adjust information in the database that defines the features of the selected one of candidate items based on the extracted at least one visual feature and at least one non visual feature of the purchase item.

2. The retail checkout system of claim 1,
    further comprising an optical code reader to read an optical code for the purchase item,
    wherein the memory further comprises computer readable program code that when executed by the processor causes the processor to perform operations to adjust information in the database that defines the features of one of the known items which is selected based on the optical code.

3. The retail checkout system of claim 1, wherein the memory further comprises computer readable program code that when executed by the processor causes the processor to perform operations to:
    receive information identifying a customer;
    retrieve information identifying prior items purchased by the customer; and
    further identify matches between the features of the purchase item and the features of known items that correspond to the prior items.

4. The retail checkout system of claim 1, wherein the memory further comprises computer readable program code that when executed by the processor causes the processor to perform operations to:
    retrieve information identifying prior items that have been purchased at rates exceeding defined thresholds; and
    further identify matches between the features of the purchase item and the features of known items that correspond to the prior items.

5. The retail checkout system of claim 1, wherein the memory further comprises computer readable program code that when executed by the processor causes the processor to perform operations to:
    recognize characters from the output of the visual sensor; and
    further identify matches between the characters from the output of the visual sensor and the features of the known items.

6. The retail checkout system of claim 1, wherein the non-visual sensor comprises a magnetometer configured to measure strength of magnetic fields from the purchase item, wherein the memory further comprises computer readable program code that when executed by the processor causes the processor to perform operations to identify matches between the strength of magnetic fields from the purchase item and the features of the known items.

7. The retail checkout system of claim 1, wherein the non-visual sensor comprises a millimeter wave scanner configured to identify features of an object inside packaging of the purchase item, wherein the memory further comprises computer readable program code that when executed by the processor causes the processor to perform operations to identify matches between the features of the object inside packaging of the purchase item and the features of the known items.

8. The retail checkout system of claim 1, wherein the non-visual sensor comprises a spectrometer configured to measure chemical composition features of a surface of the purchase item, wherein the memory further comprises computer readable program code that when executed by the processor causes the processor to perform operations to identify matches between the chemical composition features of the surface of the purchase item and the features of the known items.

9. The retail checkout system of claim 1, wherein the non-visual sensor comprises an ultrasonic sensor configured to measure surface hardness of the purchase item, wherein the memory further comprises computer readable program code that when executed by the processor causes the processor to perform operations to identify matches between the surface hardness of the purchase item and the features of the known items.

10. The retail checkout system of claim 1, wherein the non-visual sensor comprises an ultrasonic sensor configured to identify features of an object inside packaging of the purchase item, wherein the memory further comprises computer readable program code that when executed by the processor causes the processor to perform operations to identify matches between the features of the object inside packaging of the purchase item and the features of the known items.

11. The retail checkout system of claim 1, wherein the non-visual sensor comprises an infrared wavelength sensing camera configured to output an infrared image of the purchase item, wherein the memory further comprises computer readable program code that when executed by the processor causes the processor to perform operations to identify matches between a contrast map of the infrared image of the purchase item and the features of the known items.

12. A method by a retail checkout system comprising a processing device, the method comprising:
  receiving by the processing device, an image of a purchase item from a visual sensor;
  extracting, by the processing device, at least one visual feature of the purchase item from the image of the purchase item;
  receiving, by the processing device, data indicative of at least one non-visual feature of the purchase item from a non-visual sensor, wherein the non-visual sensor comprises one of a magnetometer, a millimeter wave scanner, a spectrometer, an ultrasonic sensor, and an infrared wavelength sensing camera;
  receiving, by the processing device, data indicative of a weight of the purchase item from a scale;
  identifying, by the processing device, a group of candidate items from known items based on a comparison between the at least one visual feature, at least one non-visual feature, and weight of the purchase item and features of known items retrieved from a database;
  causing, by the processing, device, a displaying of information identifying the candidate items;
  receiving, by the processing device, a command selecting one of the candidate items as matching the purchase item; and
  adjusting, by the processing device, information in the database that defines the features of the selected one of the candidate items based on the features of the purchase item.

13. The method of claim 12, wherein receiving the command selecting one of the candidate items as matching the purchase item comprises receiving a signal indicative of an optical code read from the item by an optical code reader.

14. The method of claim 12, further comprising:
  receiving information identifying a customer;
  retrieving information identifying prior items purchased by the customer; and
  identifying matches between the features of the purchase item and the features of known items that correspond to the prior items.

15. The method of claim 12, further comprising,
  retrieving information identifying prior items that have been purchased at rates exceeding defined thresholds; and
  identifying matches between the features of the purchase item and the features of known items that correspond to the prior items.

16. The method of claim 12, further comprising:
  recognizing characters from the image of the purchase item; and
  identifying matches between the characters from the image of the purchase item and the features of known items.

17. The method of claim 12, wherein receiving, by the processing device, data indicative of at least one non-visual feature of the purchase item from the non-visual sensor comprises receiving data indicative of a measured strength of magnetic fields emanating from the purchase item.

18. The method of claim 12, wherein receiving, by the processing device, data indicative of at least one non-visual feature of the purchase item from the non-visual sensor comprises receiving data indicative of a scan of features of an object inside packing of the purchase item by a millimeter wave scanner.

19. The method of claim 12, wherein receiving, by the processing device, data indicative of at least one non-visual feature of the purchase item from the non-visual sensor comprises receiving data indicative of a measurement of chemical composition of a surface of the purchase item by a spectrometer.

20. The method of claim 12, wherein receiving, by the processing device, data indicative of at least one non-visual feature of the purchase item from the non-visual sensor comprises receiving data indicative of a measurement of surface hardness of the purchase item by an ultrasonic sensor.

21. The method of claim 12, wherein receiving, by the processing device, data indicative of at least one non-visual feature of the purchase item from the non-visual sensor comprises receiving data indicative of an identification of features of an object inside packaging of the purchase item by an ultrasonic sensor.

22. The method of claim 12,
  wherein receiving, by the processing device, data indicative of at least one non-visual feature of the purchase item from the non-visual sensor comprises receiving data indicative of an infrared image of the purchase item obtained using an infrared wavelength sensing camera, and wherein identifying the group of candidate items comprises identifying matches between a contrast map of the infrared image of the purchase item and the features of the known items.

* * * * *